United States Patent
Shyne et al.

[15] 3,668,062
[45] June 6, 1972

[54] THREE-DIMENSIONAL CRYSTAL WHISKERS AND METHOD FOR PREPARATION THEREOF

[72] Inventors: James J. Shyne, Caldwell; John V. Milewski, Saddle Brook, both of N.J.

[73] Assignee: General Technologies Corporation, Reston, Va.

[22] Filed: Sept. 8, 1969

[21] Appl. No.: 856,066

Related U.S. Application Data

[63] Continuation-in-part of Ser. No. 479,111, Aug. 12, 1965, abandoned.

[52] U.S. Cl..........................161/177, 23/142, 117/46 CG, 117/106 A, 117/106 C, 117/106 R, 161/172
[51] Int. Cl. .....................................C23c 13/00, C01f 7/02
[58] Field of Search ..............23/142; 161/72, 169, 170, 182, 161/172, 177, 213, 225; 117/26, 106, 107.2, 42, 160, 123, 140, 106 C, 46 CG, 106 R, 106 A; 106/65, 286

[56] References Cited

UNITED STATES PATENTS

| | | |
|---|---|---|
| 3,077,380 | 2/1963 | Wainer et al. ..........................23/142 |
| 3,476,641 | 11/1969 | Milewski................................161/170 |

FOREIGN PATENTS OR APPLICATIONS

| | | |
|---|---|---|
| 608,032 | 11/1960 | Canada....................................23/142 |

*Primary Examiner*—Robert F. Burnett
*Assistant Examiner*—Roger L. May
*Attorney*—Laurence R. Brown

[57] ABSTRACT

The invention disclosed is for three-dimensional crystal whiskers, a method for preparation thereof, and products containing such crystal whiskers. In one embodiment, the three-dimensional whiskers include a principal, rigid, elongated single crystal whisker fiber having a plurality of secondary, relatively shorter length, single crystal whiskers appended along the length of each of the principal whiskers and disposed in a direction generally transverse the axis of each of the principal whiskers. In a second embodiment, the crystal whiskers may be characterized as a cluster ball of needle-like whiskers.

7 Claims, 8 Drawing Figures

PATENTED JUN 6 1972

PRESENT WHISKER PRODUCTS
- CLUSTER BALL-NEEDLE
- THREE-DIMENSIONAL
- INDIVIDUAL

PRIOR ALPHA-ALUMINA WHISKERS
- MAT
- WOOL & LOOSE
- CLUSTER BALL
- ALUMINUM PELLETS

INVENTORS
JAMES J. SHYNE
JOHN V. MILEWSKI

BY *Laurence R. Brown*

ATTORNEY

INVENTORS
JAMES J. SHYNE
JOHN V. MILEWSKI

BY Laurence R. Brown

ATTORNEY

THREE-DIMENSIONAL CRYSTAL WHISKERS AND METHOD FOR PREPARATION THEREOF

This application for United States Letters patent is a continuation-in-part application of Ser. No. 479,111, filed Aug. 12, 1965, now abandoned.

The present invention relates to new three-dimensional crystal whiskers, a method for preparing such crystal whiskers, and products incorporating same. More particularly, this invention provides three-dimensional whiskers which include a principal, rigid, elongated single crystal whisker fiber having a plurality of secondary, relatively shorter length, single crystal whiskers appended along the length of each of the principal whiskers and disposed in a direction generally transverse the axis of each of the principal whiskers. In a second embodiment, the crystal whiskers appear as a cluster ball of needle-like whiskers.

In patent applications by the inventors hereof, one entitled "Method of Growing Alpha-Alumina Single Crystal Ribbons," Ser. No. 373,982, filed June 10, 1964 now abandoned, and its continuation application Ser. No. 443,153, filed Mar. 26, 1965 now U.S. Pat. No. 3,421,851 issued Jan. 14, 1969; and a second entitled "Fibrous, Alpha-Alumina Single Crystal Article and Method of Making Same," Ser. No. 383,773, filed July 20, 1964 now abandoned, and its continuation-in-part application Ser. No. 443,053, filed Mar. 26, 1965 now abandoned, methods are disclosed for high yield preparation of novel alpha-alumina whiskers. Specifically, in the first of these applications, a method is disclosed for making alpha-alumina whiskers in individual, wool and cluster ball forms. In the second application a whisker mat of alpha-alumina is disclosed which is prepared when a cover is placed over a charge receptacle. By practice of the present invention, new whisker growth products are surprisingly obtained using similar reaction conditions as described in these aforementioned patent applications.

Single crystal fibers, filaments and ribbons of metal elements and compounds, otherwise known as "whiskers" have been studied extensively during the past decade. In general these crystal forms may be considered as resulting from a restricted growth mechanism, wherein the length dimension of the crystal builds up preferentially to other growth directions resulting in whiskers having substantially a two-dimensional shape.

Considerable difficulties have been encountered in fabrication of whisker composites because of their extremely small size and the requirements that the high strength characteristics of the whiskers be maintained.

In application, whiskers have been employed as a reinforcing medium in composites using plastic, metal, or ceramic matrix materials. Two-dimensional whiskers, however, have limited ability to strengthen the matrix body. Specifically, although two-dimensional whiskers may reinforce matrix materials, this reinforcement appears only through the longitudinal axis surfaces of the crystal. With some prior art techniques, the composite strength thus is lost. Specifically, the reinforcing whiskers will not permit an effective transfer of a load or stress between the matrix and the whiskers. This also serves as a stress concentration point causing premature fracture of the composite. In other instances voids may develop around the reinforcing whiskers due to change in the respective molar volumes. This problem has been so acute that efforts have been directed to coating the whiskers with several layers of various materials to serve as bonding agents between the matrix and the whiskers.

A three-dimensional whisker, on the other hand, binds a matrix more effectively to provide greater composite strength. In general whisker-matrix binding in composite is effected within and between layers of the matrix.

It has now been found by the practice of the present invention that a novel three-dimensional whisker may be prepared economically and in high yield for use as a high-strength reinforcing agent.

Generally stated, the present invention provides a three-dimensional single crystal whisker which includes a principal, rigid, elongated single crystal whisker fiber having a plurality of secondary, relatively shorter length, single crystal whiskers disposed along the longitudinal surface of the principal whisker fiber and generally appended thereto in a direction relatively transverse to the longitudinal axis of the principal whisker. In an embodiment of the invention, the principal whisker fiber, which forms a backbone is formed of silicon. The appended secondary whiskers are formed of a compound such as aluminum oxide, silicon carbide, aluminum oxycarbide, or aluminum nitride. The latter two aluminum compounds have isomorphous single crystal structures and are essentially equivalent for use herein.

According to another embodiment of the invention, the elongated principal whisker fiber is formed of aluminum oxide and the shorter secondary whiskers are formed of aluminum nitride and silicon carbide.

In preparing the present three-dimensional single crystal whiskers, there is produced simultaneously therewith a so-called "cluster-ball-needle" whisker product which is characterized as a soft, fine, fluffy or wool-like clusterball of alpha-alumina whiskers having attached thereto whisker needles of a compound selected from the group consisting of aluminum nitride, aluminum oxycarbide, silicon carbide, and mixtures thereof. The present method thus prepares three-dimensional single crystal whiskers and cluster-ball whisker products.

The method of the present invention, generally stated, provides for preparation of three-dimensional single crystal whiskers and cluster-ball-needle whiskers economically and in high yields by melting a source of aluminum in a refractory ceramic receptacle composed of alumina and silica desirably admixed with a small amount of other metallic oxides, such as zirconia, titania or magnesia, and powdered aluminum. The ceramic receptacle is loosely fitted with a ceramic cover usually made of the same composition as the receptacle but excluding the aluminum powder. The loosely covered receptacle is next disposed on a carbon block within a gaseous charged quartz tube heated sufficiently to melt aluminum. The method proceeds in three distinct stages, designated pre-growth, growth, and final growth stages. During the pre-growth stage, aluminum is wetted into the ceramic receptacle in an inert atmosphere, usually of relatively dry hydrogen gas. At the end of the pre-growth stage characterized with an initial burst of vaporous aluminum oxide, nucleation and growth of whiskers commences. During this growth stage, a substantial amount of water is added to the gaseous charge entering the quartz tube. After a maximum concentration of water has been supplied over the melt, the final growth stage commences during which the melt is desirably heated at a steadily increasing temperature. Thereafter, the melt is removed from the quartz tube, cooled and the crystals are recovered.

Practice of the present invention will become more apparent from the following detailed description taken in conjunction with the accompanying drawings wherein:

FIG. 1 diagrammatically illustrates a method for preparing the present whisker products;

FIG. 2 further illustrates, diagrammatically, the relative formation of whisker products within a loosely covered receptacle;

Figure 1:
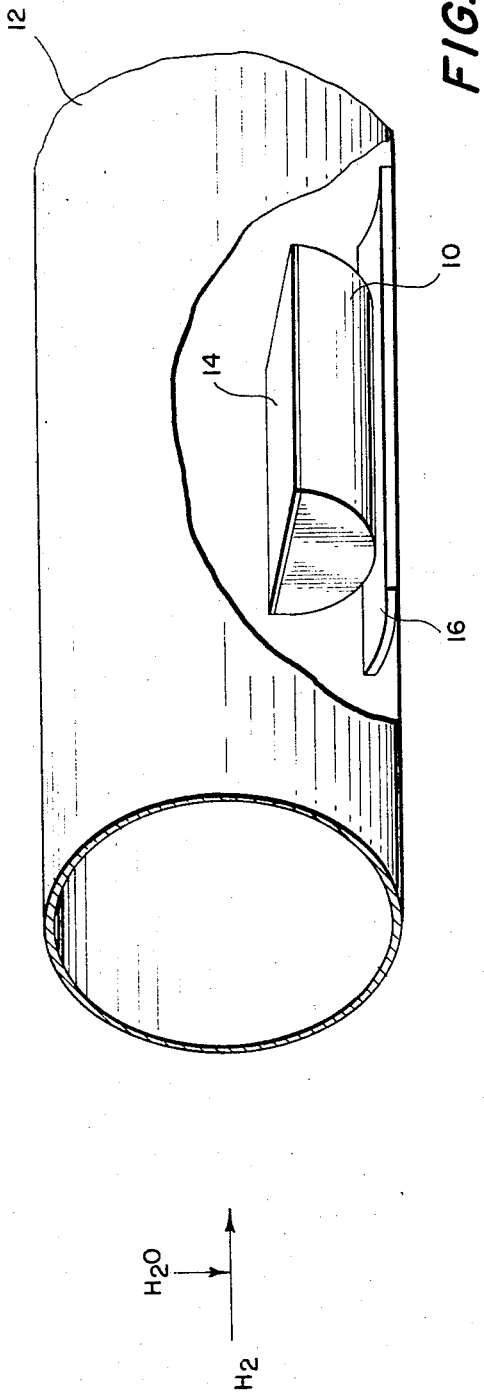
Figure 2:
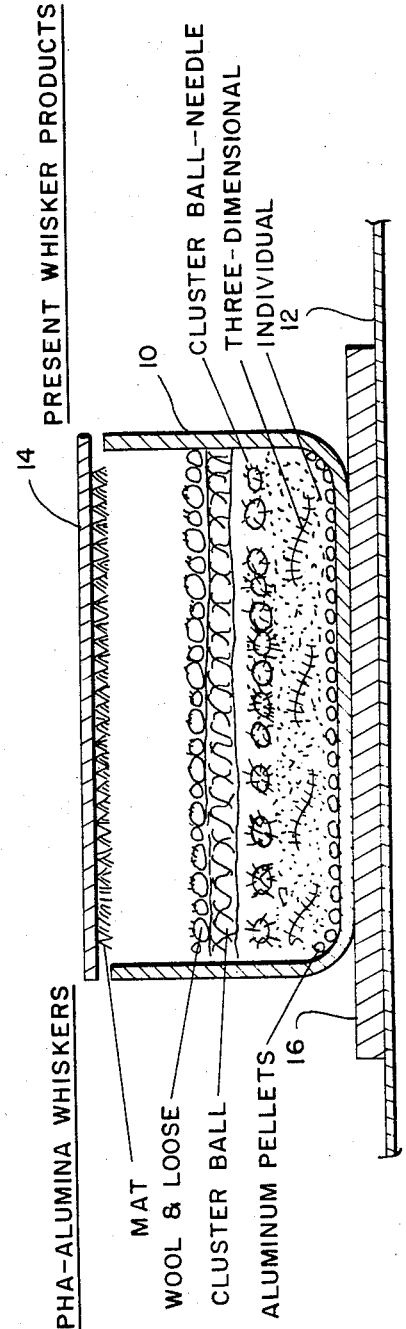

Referring to the drawings, FIG. 1 shows diagrammatically a method for formation of the present whisker products. In general, the method used is similar to that employed by the present inventors previously for making alpha-alumina whiskers per se. In FIG. 2, the prior whisker products are shown and identified on the left-hand side of the figure while the novel whisker products of the present invention are illustrated at their position of formation, and identified on the right-hand side of FIG. 2.

Figure 3:
FIG. 3 is an actual reproduction of a photomicrograph taken at about 100 × of the three-dimensional whiskers of the present invention.
Figure 4:
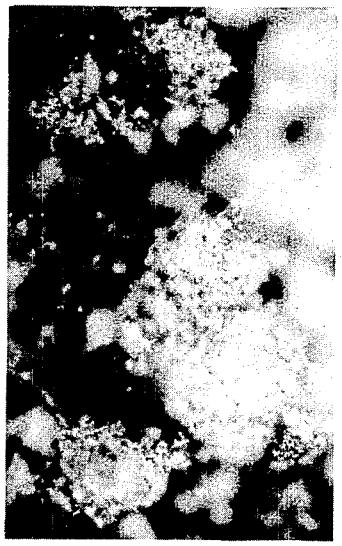
FIG. 4 is a photomicrograph taken at 100 × of the cluster-ball-whiskers of this invention.
Figure 5:
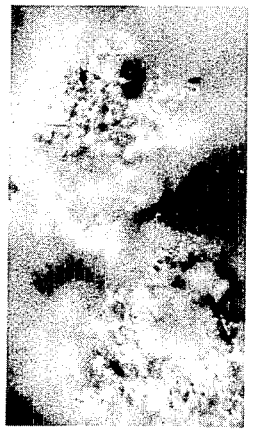
FIG. 5 is another photomicrograph of the whiskers of FIG. 4 taken at 200 ×.
Figure 6:
FIG. 6 is a photomicrograph of whiskers taken at 100 ×.
Figure 7:
FIG. 7 is a photomicrograph of whiskers taken at 200 ×.
Figure 8:
FIG. 8 is a photomicrograph of whiskers taken at 800 ×.

FIGS. 3-8 show reproductions of photomicrographs of the novel products of the invention. FIG. 3 shows the present three-dimensional whiskers including a rigid, elongated principal whisker fiber to which is attached in a direction generally transverse thereto shorter length secondary whiskers. FIGS. 4-5 show whisker cluster-ball products of this invention. The fluffy, wool-like center of fine, white whiskers are aluminum oxide (alpha-alumina) and attached and growing out of the whisker center are darker, coarse whiskers of the aluminum nitride.

The present whiskers generally have a length of about 30 to about 600 microns; a diameter of about 3 to about 30 microns and a length-to-diameter ratio of about 10:1 to about 200:1. The silicon whiskers have length and diameter dimensions near the upper end of the stated ranges, while the aluminum oxide, aluminum nitride, aluminum oxycarbide and silicon carbide whiskers have dimensions nearer the lower end of the range. Usually the alpha-alumina whiskers of the cluster ball have a length of about 50 to about 1,000 microns and a diameter of about 0.2 to about 10 microns; and the whisker needles attached thereto have a length of about 100 microns and a diameter of about 5 microns.

The whisker materials produced herein are summarized below:

I. THREE-DIMENSIONAL, ELONGATED WHISKER PRODUCTS
    Principal Rigid Fiber     Secondary Appended Whiskers
    A. silicon
        1. aluminum oxide
        2. aluminum nitride (aluminum oxycarbide)
        3. silicon carbide
    B. aluminum oxide
        1. aluminum nitride (aluminum oxycarbide)
        2. silicon carbide
(A) and (B) products are relatively dark in appearance.

II. CLUSTER-BALL-NEEDLE WHISKER PRODUCT
    Cluster Ball     Appended Whiskers
    A. aluminum oxide
        1. aluminum nitride (aluminum oxycarbide)
        2. silicon carbide
Product tends to be relatively white in appearance.

III. INDIVIDUAL WHISKERS
    A. silicon
    B. aluminum oxide
    C. aluminum nitride (aluminum oxycarbide) and/or
    D. silicon carbide IV. WHISKER COMPOSITION
    A. Products I (A) and (B), and III in combination;
    B. Products II and III in combination; and
    C. Products I (A) and (B) above in combination.

Typically products I (A) and I (B) comprises about equal parts by weight each of the rigid principal fibers and the appended secondary whisker. In product II above, about 55 to about 65 parts by weight appear as cluster-ball-whiskers with the remainder being appended whisker.

The whisker products may be prepared by the process developed by applicants for growing alpha-alumina whiskers. This process is described in detail in application Ser. No. 443,153, filed Mar. 26, 1965, entitled "A method of Growing Alpha-alumina Ribbons."

In FIG. 1, boat receptacle 10 illustrated in quartz tube 12, is composed of alumina and silica admixed with a small amount of other metallic oxides, such as zirconia, titania or magnesia, and powdered aluminum. The aluminum particles usually are present in an amount between about 1 to about 5 percent by weight of the receptacle. Generally, the finer the particle size of the aluminum, the lower is the amount of aluminum required in the receptacle composition. For example, at a particle size of 200 mesh, an aluminum content of about 2.5 to about 7.5 percent by weight is preferred.

Receptacle or boat 10 is loosely fitted with ceramic cover 14, usually made of the same composition as the boat but excluding the aluminum powder. In one embodiment of the invention, a small proportion of powdered carbon is included in the composition of ceramic cover 14.

The manner of preparing receptable 10 and cover 14 is an important factor in practice of the present invention for increasing the yield of product. In accordance with a preferred embodiment of the invention, finely divided alumina or an alumina composition; and the aluminum powder, are mixed thoroughly and fired at an elevated temperature, preferably between about 2000° F. to about 2500° F., and optimally at about 2200° F.

Presence of aluminum metal in intimate contact with alumina in receptacle 10 for the aluminum charge is important to the present method because such a receptacle enables production of vaporous aluminum oxide at a more controlled rate than with an alumina receptacle, thus providing a sustained growth step of whiskers at a uniform rate.

Boat 10 is kept on carbon sill 16 within quartz tube 12. The tube is heated by a suitable means to an elevated temperature sufficient to melt the aluminum.

The present method proceeds in three distinct pregrowth, growth, and final growth stages. During the pregrowth stage, aluminum charge is wetted into the ceramic receptacle 10 in an inert atmosphere, usually of hydrogen gas. No significat whisker growth appears during this stage. Dry hydrogen is passed over the aluminum charge which is kept as dry as possible in the pregrowth stage, suitably containing no higher than 50 parts water vapor per million parts gas (p.p.m.). At the end of the pre-growth stage, an initial burst of vaporous aluminum oxide is observed, and the stage of nucleation and growth of whiskers commences. At this point, a substantial amount of water is added to the hydrogen gas atmosphere passing above the melt, suitably up to a maximum of 40,000 parts water vapor per million parts of gas (p.p.m.). Water preferably is added incrementally while the whiskers are growing. A maximum water concentration is present over the melt at the end stage of the run, referred to herein as the final growth stage. Preferably, the water concentration is about 300 p.p.m. at the beginning of the growth stage and about 3000 p.p.m. during the final growth stage.

The pre-growth stage at the start of the run, usually takes about 10 minutes. During this stage the dry hydrogen gas stream is maintained at a high rate of flow, generally between about 0.01 to about 0.06 cu.ft./sec; and optimally at about 0.03 cu.ft./sec. During whisker growth, however, the hydrogen flow rate is substantially reduced relative to the initial dry gas flow rate. Preferably the rate for the early stages of growth is in the range of about 0.001 to about 0.03 cu.ft./sec.; with about 0.001 cu.ft./sec. being considered optimum. For the final stage of growth, a flow rate of about 0.0001 cu.ft./sec. is preferred. The flow rates given are relative to the dimensions of the apparatus used, which are described in greater detail in the examples.

The temperature of the melt may be held constant during the run, as for example, between about 2200° F. to about 3500° F. However, for a high yield of whisker product, it is preferable that the melt be heated at a steadily increasing temperature during the growth and final growth stages, preferably from about 2500° F. to about 3100° F. during a run of about 1 hour.

The invention now will be illustrated with reference to the following more specific examples.

EXAMPLE 1

A mixture of 3 lbs. 2 oz. of ceramic powder material sold by Norton and Co. by designation "1162" having the following composition: 75 parts by weight alumina, 15 parts by weight silica, 5 parts by weight titania, 2.5 parts by weight ferric oxide and 2.5 parts by weight of other metallic oxides; and 0.16 lb. of 200 mesh aluminum powder (5 percent by weight of aluminum) is prepared in a slip-casting mold in the shape of a boat. The green ceramic mold is fired in the air at 2200° F. for about a ½-hour. The boat has the dimensions 5×17×2 inches, and weighs about 3 lbs. 4 oz. A ceramic cover for the boat is similarly prepared except no aluminum powder is employed.

Into this boat is charged 2 lbs. 8 oz. of aluminum pellets which are spread evenly on the bottom of the boat. The boat and aluminum charge is loosely covered with a ceramic cover and placed on a carbon sill in a quartz tube as shown in FIG. 1, and inserted into a furnace having a cross-sectional open area of about 20 square inches. The temperature of the furnace is set at 2,775° F. Purified hydrogen containing less than 20 p.p.m. of water vapor then is admitted into the furnace over the charge at a flow rate of 0.01 cu.ft./sec. for a period of about ten minutes. Thereupon a vaporous substance is produced from the charge. At this point 300 p.p.m. of water is added to the hydrogen gas stream and the flow rate is decreased to 0.001 cu.ft./sec. After about thirty minutes, the water content of the hydrogen is increased to 3000 p.p.m. and the flow rate is decreased to 0.0001 cu.ft./sec.. After about an hour the boat is pulled from the furnace and cooled in air to room temperature.

A three-dimensional, dark whisker product is found in the boat in the region below a cluster-ball deposit of pure aluminum oxide whiskers. The product has a dark, rigid, elongated center whisker fiber of silicon and a plurality of white whiskers of alpha-alumina, aluminum nitride and aluminum oxycarbide attached at various points along the length of the whisker fiber. The silicon whisker has a diameter of about 30 microns, a length of about 600 microns and a length-to-diameter ratio of about 20 to 1. The alpha-alumina, aluminum nitride, aluminum oxycarbide and silicon carbide whiskers have diameters of about 3 microns and lengths of about 30 to 100 microns.

Another three-dimensional whisker product obtained has an aluminum oxide center with aluminum nitride and silicon carbide whiskers attached thereto. The product consists in total composition of about 5% silicon, 30% aluminum oxide, 5% silicon carbide, and 60% by weight of aluminum nitride and aluminum oxycarbide. About one-half of the aluminum nitride, however, is in the form of individual whiskers found among the product.

Above the three-dimensional whisker product is found a cluster ball-needle whisker product. This product is more nearly white in appearance and consists of a fine, fluffy whisker center of alpha-alumina (65 percent parts by weight) with whisker needles of aluminum nitride (or the isomorphous aluminum oxycarbide) 30 parts by weight. The alpha-alumina whiskers have a diameter of about 0.2 to about 10 microns and a length of about 50 to about 1,000 microns. The needle whiskers attached thereto have a diameter of about 1 to about 30 microns and a length of about 100 to about 5000 microns. The total yield of the above obtained whisker products is about 6–7 grams.

EXAMPLE 2

The procedure of Example 1 is followed except that about 1 percent by weight of powdered graphite is included in the cover composition. The total yield is 15–20 grams, primarily in the cluster ball-needle product form.

It is to be understood that all parts given herein are by weight unless otherwise indicated.

It is to be understood that the foregoing detailed description is given merely by way of illustration and that many variations may be made therein without departing from the spirit thereof.

What is claimed is:

1. A three-dimensional single crystal whisker which comprises a principal rigid elongated single crystal whisker fiber composed of silicon and a plurality of relatively shorter length secondary single crystal whiskers being individually a plurality of aluminum oxide, aluminum nitride, aluminum oxycarbide, and silicon carbide whiskers spaced along the longitudinal axis of said principal whisker fiber and appended thereto in a direction generally transverse to said axis.

2. A three dimensional single crystal whisker which comprises a principal rigid elongated single crystal whisker fiber composed of aluminum oxide and a plurality of relatively shorter length secondary single crystal whiskers being individually a plurality of aluminum nitride, aluminum oxycarbide, and silicon carbide whiskers spaced along the longitudinal axis of said principal whisker fiber and appended thereto in a direction generally transverse to said axis.

3. A method for preparing three-dimensional whiskers which comprises:
   a. melting an aluminum source material in a ceramic receptacle formed of alumina and silica, said ceramic receptacle being fitted loosely with a ceramic cover having carbon on the surface covering the ceramic receptacle,
   b. contacting said melt with substantially dry hydrogen gas and
   c. thereafter further contacting said melt with hydrogen gas containing a significant amount of water vapor.

4. The method of claim 3 wherein ceramic receptacle is composed of alumina and silica admixed with a small amount of zirconia, titania or magnesia, and powdered aluminum; and wherein the ceramic cover is composed of alumina and silica admixed with a small amount of zirconia and titania or magnesia.

5. The method of claim 3 wherein the water vapor content of hydrogen gas of Step (b) is less than about 50 parts water vapor per million parts hydrogen gas.

6. The method of claim 3 wherein the water vapor content of hydrogen gas of Step (c) is up to about 40,000 parts water vapor per million parts hydrogen gas.

7. The method of claim 3 wherein the water vapor content of hydrogen gas of Step (c) is from about 300 parts to about 3000 parts water vapor per million parts hydrogen gas.

* * * * *